US009169832B2

United States Patent
Shao et al.

(10) Patent No.: US 9,169,832 B2
(45) Date of Patent: Oct. 27, 2015

(54) GROUND HIGH-TEMPERATURE HIGH-EFFICIENCY SOLAR STEAM ELECTRICITY-GENERATING DEVICE

(75) Inventors: Ruixun Shao, Guangzhou (CN); Barry Yifan Gao, Honolulu, HI (US)

(73) Assignee: Guangdong Fuxing Food Machinery Co., Ltd., Chaozhou, Guangdong Province (CN)

( * ) Notice: Subject to any disclaimer, the term of this patent is extended or adjusted under 35 U.S.C. 154(b) by 406 days.

(21) Appl. No.: 13/822,904

(22) PCT Filed: Sep. 13, 2010

(86) PCT No.: PCT/CN2010/076830
§ 371 (c)(1),
(2), (4) Date: Mar. 13, 2013

(87) PCT Pub. No.: WO2012/034263
PCT Pub. Date: Mar. 22, 2012

(65) Prior Publication Data
US 2013/0219889 A1 Aug. 29, 2013

(51) Int. Cl.
*F03G 6/00* (2006.01)
*F03G 6/06* (2006.01)
(Continued)

(52) U.S. Cl.
CPC . *F03G 6/067* (2013.01); *F01K 3/12* (2013.01); *F22B 1/006* (2013.01); *H02K 7/1823* (2013.01);
(Continued)

(58) Field of Classification Search
CPC ..... F01K 3/12; F03G 2006/061; F03G 6/067; F22B 1/006; F24J 2/085; F24J 2/24; F24J 2/51; F24J 2/541; H02K 7/1823; Y02E 10/46
USPC ..................... 60/641.1–641.15; 126/569–713
See application file for complete search history.

(56) References Cited

U.S. PATENT DOCUMENTS 7,954,321 B2 * 6/2011 Shinnar ........................ 60/641.8
8,544,273 B2 * 10/2013 Brenmiller et al. .......... 60/641.8
(Continued)

FOREIGN PATENT DOCUMENTS

CN 2906462 Y 5/2007
CN 100559075 C 11/2009
(Continued)

OTHER PUBLICATIONS

International Search Report dated Jun. 23, 2011 from PCT/CN2010/076830, 7 pages.

*Primary Examiner* — Jesse Bogue
(74) *Attorney, Agent, or Firm* — Ohlandt, Greeley, Ruggiero & Perle, L.L.P.

(57) ABSTRACT

A ground high-temperature high-efficiency solar steam electricity-generating device includes a light convergence assembly (1), a heat exchanger assembly (3), a heat storage chamber assembly (5), a base assembly (2), an oil pump (15), a temperature-controlling valve (16), a steam turbine (13), temperature-controlling valve (16), a steam turbine (13), an electricity-generator (12), a system control circuit, a water pump (9) and a water tank assembly (10). The light convergence assembly (1) includes a glass plate (1-1), Fresnel lenses, a U-shaped groove (1-3), a thermal insulating material, a heat collecting pipe (1-5), high temperature heat conducting oil (6-6), a frame (1-7), a rib-plate and a spindle sleeve. The high temperature heat conducting oil (6-6) in the heat collecting pipe (1-5) is communicated with the heat exchanger assembly (3) and the heat storage chamber assembly (5), so that the warm water in the heat exchanger assembly (3) is quickly converted into high temperature steam which drives the steam turbine (13) and the electricity-generator (15) to generate electrical energy. The device can realize high solar utilization, high automaticity, simple structure, lower cost, small size, and is safe and reliable.

11 Claims, 4 Drawing Sheets

(51) Int. Cl.
    *F01K 3/12*  (2006.01)
    *F22B 1/00*  (2006.01)
    *H02K 7/18*  (2006.01)
    *F24J 2/08*  (2006.01)
    *F24J 2/24*  (2006.01)
    *F24J 2/51*  (2006.01)
    *F24J 2/54*  (2006.01)

(52) U.S. Cl.
    CPC ............ *F03G 2006/061* (2013.01); *F24J 2/085* (2013.01); *F24J 2/24* (2013.01); *F24J 2/51* (2013.01); *F24J 2/541* (2013.01); *Y02E 10/46* (2013.01)

(56) References Cited

U.S. PATENT DOCUMENTS

| | | | |
|---|---|---|---|
| 8,851,066 B1 * | 10/2014 | Kapteyn | 126/620 |
| 2006/0174622 A1 * | 8/2006 | Skowronski | 60/641.8 |
| 2008/0216822 A1 * | 9/2008 | Lazzara et al. | 126/617 |
| 2009/0179429 A1 * | 7/2009 | Ellis et al. | 290/1 R |

FOREIGN PATENT DOCUMENTS

| | | |
|---|---|---|
| CN | 101592136 A | 12/2009 |
| CN | 201513205 U | 6/2010 |
| DE | 103 29 623 B3 | 1/2005 |
| GB | 2 449 181 A | 12/2008 |
| WO | WO 2008/109746 A2 | 9/2008 |

\* cited by examiner

GROUND HIGH-TEMPERATURE HIGH-EFFICIENCY SOLAR STEAM ELECTRICITY-GENERATING DEVICE

BACKGROUND OF THE INVENTION

The present invention relates to a steam generator, and more particularly to a ground high-temperature high-efficiency solar steam electricity-generating device.

BACKGROUND OF THE INVENTION

The heat with higher temperature is more useful and valuable. In thermodynamics, the heat at high temperature is called high-quality energy. These energy sources, such as pentane ($C_5H_{12}$), gasoline, hydrogen, electricity, friction energy etc, have a common feature in reaching an extremely high temperature when applied. On the contrary, the thermal energy at low temperature is called low-quality energy or waste heat which is of limited use. For example, the heat of the cooling water recycled by a cooling tower of a power plant can be used for domestic hot water only. A conventional solar water heater generates hot water at less than 100° C., which can be used for a warmer, but cannot for generating electricity, cooking or refrigerating.

To make a wider range of application of solar energy, it is necessary to improve heat collecting temperature. There are five types of zones in China in view of the distribution of solar energy. Since the energy density of solar rays is low, it is necessary to increase heat collecting temperature by light convergence, namely, to converge a large area of solar rays at a very small area. The bigger the concentrating ratio is, the higher the working temperature of the heat collector is. The concentrating ratio is generally 3-10 times, and the working temperature can reach 200° C.-400° C. If the concentrating ratio is increased to 1000-3000 times, the working temperature can be higher, which is upto above 1000° C.-3000° C.

Generally, there are three types of convergence of sunlight: (1) Multi-glass reflection focus. For example, in early 1970s, a giant solar furnace with above 40 meters tall was built at Odeillo in Pyrenees of France, which has a focus temperature up to 3500° C. and an output power up to 1000 kw. It is constituted by more than 11000 flat mirrors and automatically tracks the sun. As another example, the electric station Sun No. 1 of State of California in the United States has an output up to 10,000 kw and a working temperature up to 500° C. It is constituted by 1818 pieces of heliostats, each of which is 390.1 m$^2$, and has a total area of 71064 m$^2$ and a height of 55 meters. The shape is very spectacular. (2) Parabolic concave mirror reflection focus (solar oven). (3) Groove focus (line focus). All the methods described above belong to reflection focus which is the only way of convergence of solar energy so far.

Sunlight is reflected to a point of tower by all the flat-mirrors which track the solar movement to ensure that the sunlight concentrate on a focal point. The tracking of the reflecting mirrors needs an adjustment in two directions (double-axis), so as to track solar movement and changes of the solar elevation caused by the seasonal changes.

Since the line-focus is realized by concentrating the rays on a line, as long as the heat collecting pipe has a certain length, it allows to adjust the elevation every few days or even every season to collecting light instead of tracking the daily solar movement. The difficulty of manufacturing and cost of line-focus has a significant reduction compared with that of point-focus. Hence, even through the focus temperature is slightly lower than that of point-focus, it greatly attracts public attention and has many applications in developed countries.

The method of groove focus of solar energy has a simpler structure and lower cost than a tower-focus structure, and is easier to be used in tracking the sun by adjusting the solar elevation every few days or even longer depending on different seasons. The method needs only one repetition each year. Therefore, the groove focus becomes a more popular heat utilization method than tower-focus. However, most of the solar power towers described above are for study or test purpose, which have many disadvantages such as large investment, uneconomical, too large area and difficult maintenance, etc.

Solar power generation is definitely low-carbon in view of the environment protection, whilst the manufacturing of the products used for photovoltaic solar power, such as monocrystalline silicon, is actually a high-carbon industry. Even through the photovoltaic solar power is the most efficient way at present in the solar power utilization, which has approximately 15% photoelectric conversion efficiency, and even reaches 20% in the laboratory. The manufacturing of ultra-pure silicon requires a complicated process and a large power consumption, which accounts for over half of the total cost of manufacturing the solar cell. Thin-film solar cells made from amorphous silicon appeared in 1979 has a low consumption of silicon material, low cost and low weight, and is easy to be used. It can be combined with the roof of buildings to form an independent power supply of household. However, its photoelectric conversion efficiency is as low as about 10% in foreign countries and about 6%-8% in China. Moreover, thin-film solar cells are not stable and have a phenomenon of efficiency recession, and thus are not used for large solar power supply.

The thin-film solar cells developed recent years, such as cadmium sulfide, gallium arsenide, copper indium selenium etc. can reduce the cost of manufacturing monocrystalline silicon and the power consumption. However, the photoelectric conversion efficiency is between 6%-10% only and the production environmental cost is high (gallium is rare; arsenic is poison; the production investment is large; and the photoelectric conversion efficiency of cadmium sulfide is about 3.5%).

SUMMARY OF THE INVENTION

An object of the invention is to provide a ground high-temperature high-efficiency solar steam electricity-generating device which is appropriately structured, low-carbon and friendly to the environment, of high temperature and high efficiency, low cost, easy to install and maintain, and is safe and reliable. It can greatly save the land resources and can be installed in all five types of zones of solar energy distribution in China.

The present invention can be achieved by the following solutions. A ground high-temperature high-efficiency solar steam electricity-generating device comprises a water pump, a water tank assembly, a steam turbine, a generator and a system control circuit, characterized in that the device further comprises a light convergence assembly, a heat exchanger assembly, a heat storage chamber assembly, an oil pump and a temperature-controlling valve. A heat collecting pipe of the light convergence assembly is provided with a spiral sheet-metal is filled with high temperature heat conducting oil, and being respectively communicated with a high temperature oil container of the heat exchanger assembly and the heat storage chamber assembly through a high temperature heat conducting main oil pipes and then respectively through two high temperature heat conducting branch oil pipe. The high temperature heat conducting oil in the high temperature oil container of the heat exchanger assembly flows through a 3D fin pipe. Warm water in the heat exchanger assembly is heated efficiently by the heat transfer of the 3D fin pipe to convert into steam which rises and passes by an overheating space 3D fin provided over the liquid in the heat exchanger assembly to be re-heated up, and then passes through a high temperature steam pipe to the steam turbine to drive the generator for outputting electric energy into a power grid. The high temperature heat conducting oil in the high temperature oil container of the heat storage chamber assembly flows through a 3D fin pipe, transfers heat to heat storage material and then is forced into the heat collecting pipe through a low temperature oil container, a low temperature oil pipe, one of the output of temperature-controlling valve and the oil pump. The heat conducting oil continuously cycles to store heat in daytime. When the temperature in the heat collecting pipe of the light convergence assembly decreases during evening or cloudy days, the temperature-controlling valve is started up to allow the high temperature heat conducting oil in the heat storage chamber assembly enters the high temperature oil container and the 3D fin pipe of the heat exchanger assembly through the high temperature heat conducting main oil pipe and the high temperature heat conducting branch oil pipe to increase the quantity of steam and temperature in the heat exchanger assembly.

The present invention can also be achieved by the following solutions. The ground high-temperature high-efficiency solar steam electricity-generating device further comprises a water level control tank assembly. The water level control tank assembly comprises two warm water pipes and a water level switch. Warm water from the steam turbine flows into a water tank through a water pipe and then flows successively through a water pipe, a water pump, the water pipe, the water level switch and the warm water pipe to keep the water level in the heat exchanger assembly at the set water level. The ground high-temperature high-efficiency solar steam electricity-generating device may further comprise a base assembly which includes an anchor plate, four adjusting screws, two synchronous gears, a chain, a rotatable shaft, a stepping motor, vertical plates. The anchor plate is fixed on the ground by the four adjusting screws. The inclination between the anchor plate and the ground is able to be adjusted by the four adjusting screws. The vertical plates are fixedly mounted on the anchor plate. The rotatable shaft is movably inserted in the vertical plate and fixedly connected to the light convergence assembly. The stepping motor is arranged on the anchor plate. The synchronous gear is fixedly connected to the rotatable shaft of the anchor plate and the other synchronous gear is fixedly connected to the rotatable shaft. The two synchronous gears are connected by the chain. The light convergence assembly comprises: a glass plate, line-focus Fresnel lenses, an U-shaped groove, thermal insulating material, a heat collecting pipe, a spiral sheetmetal, high temperature heat conducting oil, a frame, a rib-plate, a spindle sleeve. The rectangular frame with the Golden section ratio is provide with a plurality of U-shaped grooves which is arranged in parallel in the long axis direction of the rectangular frame and on the opening of which a glass plate is laid for sealing the U-shaped grooves to form a greenhouse. The line-focus Fresnel lens is placed under the glass plate and its surface bearing against the inner surface of the glass plate. The rest space of the frame is filled with thermal insulating material. The heat collecting pipe is secured to the U-shaped groove at the position of dual focus point thereof. The heat collecting pipe is provided with a spiral sheetmetal therein and is filled with high temperature heat conducting oil. The rib-plate positioned at the bottom of the frame has a spindle sleeve which is muffle-coupled to the rotatable shaft of the base assembly. The heat exchanger assembly comprises a high temperature heat conducting branch oil pipe, a high temperature oil container, warm water, a thermal insulating layer, an overheating space 3D fin pipe, a 3D fin pipe, a low temperature oil container, a low temperature oil pipe, a high temperature steam pipe. One end of the high temperature heat conducting branch oil pipe is communicated with the high temperature heat conducting main oil pipe and the other end is communicated with the high temperature oil container and the 3D fin pipe. One end of the low temperature oil pipe is communicated with the low temperature oil container and the other end is communicated with a low temperature heat conducting pipe through the oil pump. One end of the high temperature steam pipe is communicated with a steam container within the heat exchanger assembly and the other end is communicated with the steam turbine. The 3D fin pipe is immersed in warm water. The overheating space 3D fin pipe is positioned in the steam container. The heat storage chamber assembly comprises a thermal insulating layer, a high temperature heat conducting branch oil pipe, a 3D fin pipe, heat storage material, a high temperature oil container, a low temperature oil container, a low temperature oil pipe. One end of the high temperature heat conducting branch oil pipe is communicated with the high temperature heat conducting main oil pipe and the other end is communicated with the high temperature oil container and the 3D fin pipe. One end of the low temperature oil pipe is communicated with the low temperature oil container and the other end thereof is communicated with one end of temperature-controlling valve. The temperature-controlling valve is provided with two exits A and B at the other end thereof, wherein the exit A is communicated with the low temperature heat conducting pipe through the oil pump and the exit B is communicated with the high temperature heat conducting main oil pipe. The heat storage material is positioned in the space defined by the thermal insulating layer and surrounding the 3D fin pipe. The said heat storage material may be made of heat conducting oil, cottonseed oil, mirabilite or soluble salt. A series of concentric circles are formed on one surface of the line-focus Fresnel lenses, the depth of the circles increases from the center to the peripheral of the surface, the center of the circles is a curve surface, and the other surface of the line-focus Fresnel lenses bears against the inner surface of the glass plate.

The heat collecting pipe of the light convergence assembly is made of stainless pipes and is coated by a black heat absorption layer on the surface thereof. The heat collecting pipe is provided with the spiral sheetmetal therein.

The light convergence assembly may be provided with a plurality of photoelectric sensors on the panel thereof.

The present invention has the following advantages over the prior art:

1. It is low-carbon and environmental. The solar energy is converted directly into steam thermal energy to drive turbogenerator to output electricity.

2. No components which are harmful to the environment are produced by using "high-carbon industry".

3. The light concentrator has a high solar energy conversion efficiency. The solar energy conversion efficiency in the prior art is between 10%-20%. The glass plate and the line-focus Fresnel lens are used in combination at the opening of the U-shaped groove, which can realize refraction, reflection and greenhouse effects. With such arrangement, the light convergence efficiency can reach above 85%-90%, the light convergence multiple can reach above 500-1000 times and the working temperature of light collection is about 1000° C.-2000° C. The glass plate can efficiently protect the line-focus Fresnel lenses made of PE material to have a life of more than 20 years.

4. The heat transfer fluid media within the heat collecting pipe, such as heat conducting oil or soluble salt, has a good stability and can be heated up uniformly with its temperature being adjusted and controlled precisely. It can also generate high temperature at low vapor pressure. These materials also have a big specific heat, small specific gravity, and are energy-efficient and easy to transport and manipulate. By using a 3D fin pipe of a heat exchanger according to another invention patent (ZL200610036971.7) of the inventor, the heat transfer fluid can transfer heat to water efficiently and re-heat up the steam generated to BE overheated steam.

5. A large unit area of light convergence is available. According to calculations about the five types of zones of solar energy distribution in China, for one square meter of light collection area, the daily average power capacity of the 1st region is 5.76 degrees and the annual average power capacity is 1728 degrees, the daily average power capacity of the 5th region is 2.88 degrees and the annual average power capacity is 864 degrees (assuming 300 days of sunshine per year). In practice, the power capacity of a rectangle having an area of 2 m*1.236 m according to the invention, which has a light collection area of 2.472 m$^2$, is equivalent to the power capacity generated by a disc paraboloid used in Hawaii Island of USA. This electric station has a towered collecting mirror with a diameter of about 10-15 meters (corresponding to a light collection area equal to 78.5 m$^2$-176.625 m$^2$). The power capacity of the invention is 31-71 times higher than that of the disc paraboloid used in Hawaii Island of USA. The weight of the light concentrator is ⅛, the floor area is 1/32 and the cost of production is ⅕ of the disc paraboloid.

6. Besides the high temperature and high efficient solar steam electricity-generation, the present invention is also adapted to economizing energy in various industries so as to improve the economic effectiveness. For example, it can be used for greenhouse culture and drying grain, fruit and vegetable in agriculture; fabric dyeing and finishing in industry; cooking and refining edible oil in food industry; driving a thruster coupled with the steam turbine and desalting seawater and soilless culturing of vegetable etc. which are required for life in navigation; being energy-saving emission reduction and providing stream energy for central air-conditioning of urban commercial building and large community. The device of the invention also has a small size, low weight, low cost, and is easy to find a site for installation and maintenance.

DETAILED DESCRIPTION OF PREFERRED EMBODIMENT

The present invention will now be described in detail by referring to the accompanying drawings that illustrate the preferred embodiments of the invention.

Referring to the FIG. 1 to FIG. 4, a solar steam electricity generating device according to the present invention comprises a light convergence assembly 1, a base assembly 2, a heat exchanger assembly 3, a tank assembly 4 for controlling water level, a heat storage chamber assembly 5, a water pump 9, a water tank assembly 10, a power grid 11, a steam turbine 13, an electricity-generator 12, an oil pump 15, a temperature-controlling valve 16 and a system control circuit.

Figure 2:
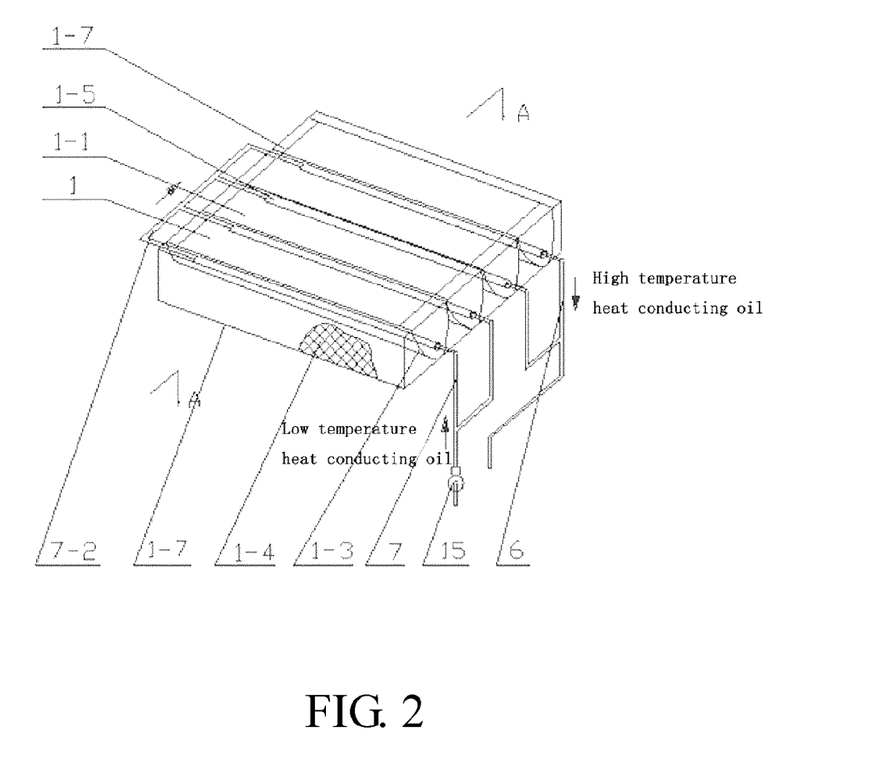
FIG. 2 is a perspective view of the circulation path of the high temperature heat conducting oil in a light convergence assembly.
Figure 3:
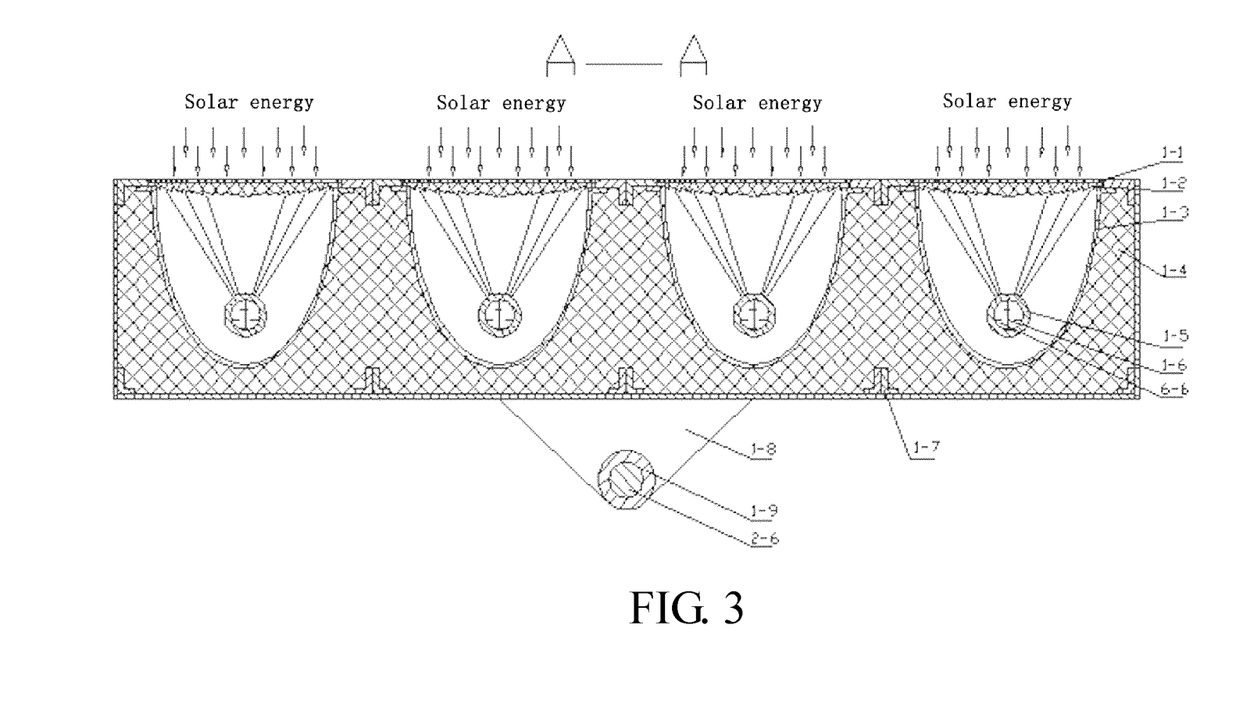
FIG. 3 is a sectional view of a light convergence assembly.

The light convergence assembly 1 comprises a glass plate 1-1, line-focus Fresnel lenses 1-2, a U-shaped groove 1-3, thermal insulating material 1-4, a heat collecting pipe 1-5, a spiral sheetmetal 1-6, high temperature heat conducting oil 6-6, a frame 1-7, a rib-plate 1-8, and a spindle sleeve 1-9. The rectangular frame 1-7 with the Golden ratio is provided with a plurality of U-shaped grooves 1-3 which are arranged in parallel in the long axis direction of the rectangular frame 1-7, with a glass plate 1-1 being provided over the U-shaped openings for sealing off the U-shaped grooves 1-3 to form a heated housing. The line-focus Fresnel lens 1-2 is pressed under the glass plate 1-1 with its surface being appressed against the inside surface of the glass plate 1-1. The frame 1-7 is higher than the U-shaped groove 1-3. The space between the outside of the U-shaped groove 1-3 and the frame 1-7 is filled with thermal insulating material 1-4. The heat collecting pipe 1-5 is secured to the U-shaped groove 1-3 at the position of dual focus point thereof. The heat collecting pipe 1-5 is provided with a spiral sheetmetal therein and is filled with high temperature heat conducting oil 6-6. The rib-plate 1-8 positioned at the bottom of the frame 1-7 has a spindle sleeve 1-9 which is muff-coupled to a rotational shaft 2-6 of the base assembly 2.

By making the projection focus of the line-focus Fresnel lenses 1-2 superpose with the reflection focus of the concave condenser of the U-shaped groove 1-3, the heat collecting pipe 1-5 positioned at the focus is heated up, and the system heat efficiency is improved by the greenhouse effect generated by the structure of the light convergence assembly. Its basic principle is as follows: The spectrum of solar light is mostly spread across the visible and near-infrared ranges, of which wavelength is generally between 0.3-3.0 microns. This band belongs to shortwave and almost all the short wave can pass through an ordinary glass. However, the light is absorbed by a black body and is converted to heat. Physically, heat radiation is also a form of material movement and mainly includes infrared radiation, the wavelength of which is more than 3.0 microns. Glass can just block out the rays with this wavelength. If a sealed incubator equipped with a transparent glass on one side is placed under sunlight, the glass functions to let sunlight enter and keep the heat radiation within the incubator. The temperature in the incubator increases gradually. Such a phenomenon is called "greenhouse effect". Generally, after 2-3 hours' sunlight exposure, the temperature in the incubator can reach approximately 150° C. Therefore, the heat collecting efficiency of the light convergence assembly can be greatly increased. The heat collecting pipe is made of stainless pipe which is connected as a loop. The heat collecting pipe is coated with a black heat trapping layer and is fed by heat conductor fluid, such as heat conducting oil and soluble salt. The heat collecting pipe 1-5 is provided with a spiral sheetmetal 1-6 therein which makes the high temperature heat conducting oil 6-6 in a spiral movement along the inner wall of the heat collecting pipe so as to heat up rapidly and uniformly. The high temperature heat conducting oil 6-6 enters respective high temperature oil container 3-6 and 5-4 of a heat exchanger assembly 3 and a heat storage chamber assembly 5 through a high temperature heat conducting main pipe 6 and then the high temperature heat conducting branch pipes 6-1, 6-2.

Figure 4:
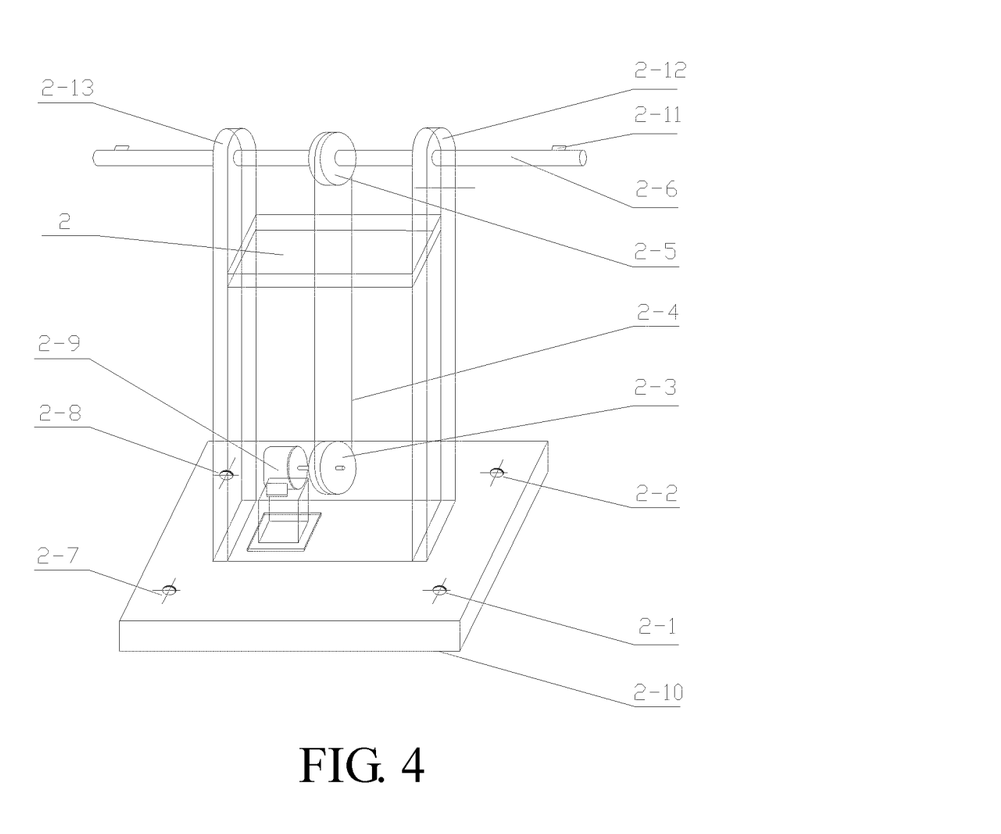
FIG. 4 is a schematic view of a base assembly.

The base assembly 2 comprises an anchor plate 2-10, four adjusting screws 2-1, 2-2, 2-7, 2-8, two synchronous gears 2-3, 2-5, a chain 2-4, a rotatable shaft 2-6, a stepping motor 2-9, and vertical plates 2-12, 2-13. The anchor plate 2-10 is fixed on the ground by the four adjusting screws 2-1, 2-2, 2-7, 2-8. The inclination between the anchor plate 2-10 and the ground can be adjusted by the four adjusting screws 2-1, 2-2, 2-7, 2-8 to adapt the change of an elevation of the light convergence assembly with respect to the sun. The vertical plates 2-12, 2-13 are fixed on the anchor plate 2-10. The rotatable shaft 2-6 is movably penetrated through the vertical plate 2-12, 2-13, and fixedly connected to the spindle sleeve 1-9 of the frame 1-7 of the light convergence assembly 1. The stepping motor 2-9 is mounted on the anchor plate 2-10 and fixedly connected to the rotatable shaft of the anchor plate 2-10. The synchronous gear 2-3 is fixedly connected to the rotatable shaft of the stepping motor 2-9. The synchronous gear 2-5 is fixedly connected to the rotatable shaft 2-6. The chain 2-4 is connected between the two synchronous gears 2-3, 2-5. The stepping motor 2-9 drives the synchronous gears 2-3, 2-5 according to the instruction issued by a plurality of photoelectric sensors arranged on the panel of the light convergence assembly 1 to make the frame 1-7 rotating, which causes the light convergence assembly connected with the frame 1-7 to keep in a high-intensity heat collecting state. The adjustment of the elevation of the surface of the light convergence assembly with respect to the solar due to change of seasons can be implemented by adjusting the four adjusting screws 2-1, 2-2, 2-7, 2-8.

Figure 1:
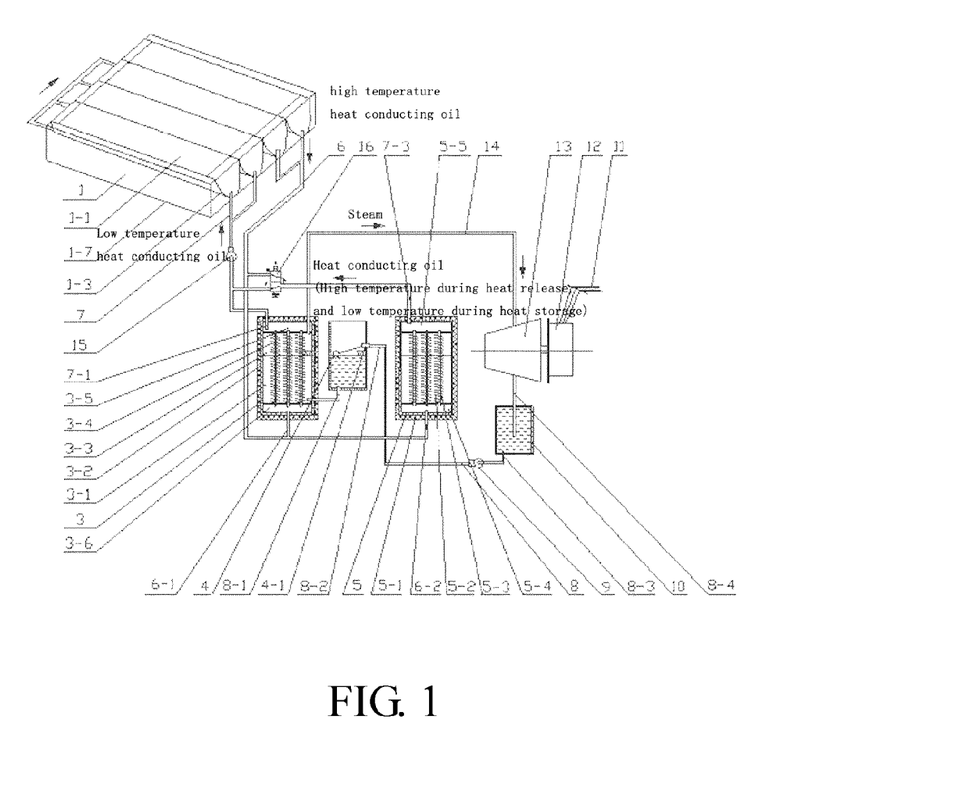
FIG. 1 is a diagram showing the connection of the system according to the present invention.

The heat exchanger assembly 3 comprises a high temperature heat conducting branch oil pipe 6-1, a high temperature oil container 3-6, warm water 3-1, a thermal insulating layer 3-2, an overheating space 3D fin pipe 3-3, a 3D fin pipe 3-4, a low temperature oil container 3-5, a low temperature oil pipe 7-1, a high temperature steam pipe 14. One end of the high temperature heat conducting branch oil pipe 6-1 is communicated with the high temperature heat conducting main oil pipe 6 and the other end is communicated with the high temperature oil container 3-6 and the 3D fin pipe 3-4. One end of the low temperature oil pipe 7-1 is communicated with the low temperature oil container 3-5 and the other end is communicated with a low temperature heat conducting pipe 7 through the oil pump 15. One end of the high temperature steam pipe 14 is communicated with a steam container 3-7 in the heat exchanger assembly 3 and the other end is communicated with the steam turbine 13. The 3D fin pipe 3-4 is immersed in warm water 3-1. The overheating space 3D fin pipe 3-3 is positioned in the steam container 3-7. The high temperature heat conducting oil 6-6 in the heat collecting pipe 1-5 enters the high temperature oil container 3-6 through the high temperature heat conducting main oil pipe 6 and the high temperature heat conducting branch oil pipe 6-1. The high temperature heat conducting oil 6-6 flows though the 3D fin pipe 3-4. The warm water 3-1 in the heat exchanger assembly 3 is heated by means of the efficient heat conducting of the 3D fin pipe 3-4 to convert into steam quickly. The steam then rises and passes by the overheating space 3D fin pipe 3-3 above the liquid in the heat exchanger assembly 3. The steam of 400-500° C. flows through the high temperature steam pipe 14 into the steam turbine 13 to drive the generator 12 which outputs power into the power grid 11.

The water level control tank assembly 4 comprises two warm water pipes 8-1, 8-2 and a water level switch 4-1. The warm water from the steam turbine 13 flows into the water tank assembly 10 through a water pipe 8-4 and then through a water pipe 8-3, the water pump 9, the warm water pipe 8-2, the water level switch 4-1 and the warm water pipe 8-1 to ensure that the warm water 3-1 in the heat exchanger assembly 3 can be kept at a set water level.

The heat storage chamber assembly 5-1 comprises a thermal insulating layer 5-1, a high temperature heat conducting branch oil pipe 6-2, a 3D fin pipe 5-2, heat storage material 5-3, a high temperature oil container 5-4, a low temperature oil container 5-5, a low temperature oil pipe 7-3. One end of the high temperature heat conducting branch oil pipe 6-2 is communicated with the high temperature heat conducting main oil pipe 6 and the other end is communicated with the high temperature oil container 5-4 and the 3D fin pipe 5-2. One end of the low temperature oil pipe 7-1 is communicated with the low temperature oil container 5-5 and the other end is communicated with one end of the temperature-controlling valve 16. The temperature-controlling valve 16 is provided with two exits A and B at the other end thereof, wherein the exit A is communicated with the low temperature heat conducting pipe 7 through the oil pump 15 and the exit B is communicated with the high temperature heat conducting main oil pipe 6. The heat storage material 5-3 is positioned in the space defined by the thermal insulating layer 5-1 and surrounds the 3D fin pipe 5-2. The heat storage material 5-3 is made of heat conducting oil, cottonseed oil, mirabilite or soluble salt, etc.

The heat storage principle of mirabilite will be described as follows. Mirabilite is a kind of sodium sulfate solid, which has 10 crystal water. The physical state of mirabilite could turn from solid to liquid when it is heated and from liquid to solid and release heat when it is solidified. With such an endothermal and exothermal characteristic, mirabilite can be used for solar heat storage. When entering into the heat exchanger assembly 3, the high temperature heat conducting oil 6-6 enters simultaneously into the heat storage chamber assembly 5 which has a substantially same structure with the heat exchanger assembly 3. The heat storage chamber assembly 5 is not used for heating water but for keeping heat in the heat storage material 5-3 such as heat conducting oil, cottonseed oil, or mirabilite. The high temperature heat conducting oil 6-6 in the high temperature oil container 5-4 flows through the 3D fin pipe 5-2 to transfer heat to the heat storage material 5-3, and then is forced into the heat collecting pipe 1-5 through the low temperature oil container 5-5, the low temperature oil pipe 7-3. the temperature-controlling valve 16 and the oil pump 15. The heat conducting oil continuously cycles to store heat in the daytime. When the temperature in the heat collecting pipe 1-5 of the light convergence assembly 1 decreases during evening or cloudy days, the temperature-controlling valve is activated to let the high temperature heat conducting oil in the heat storage chamber assembly 5 enter the high temperature oil container 3-6 and the 3D fin pipe 3-4 of the heat exchanger assembly 3 through the high temperature heat conducting main oil pipe 6 and the high temperature heat conducting branch oil pipe 6-1, thus increasing the quantity of steam and elevates the temperature in the heat exchanger assembly 3 to make the steam turbine 13 continuously generating electricity so as to be more practical. Under a condition of good thermal insulation, the heat storage chamber assembly 5 can keep the heat at a temperature up to 400-500° C. for 24 hours with a heat loss being less than 100-200° C.

The system control circuit adopts a computer to monitor all the devices to guarantee safety operation.

In practice, since the light convergence assembly 1 adopts the line-focus Fresnel lenses 1-2 to converge rays to a line having a certain length defined by the heat collecting pipe 1-5, a significant reduction of difficulty in the manufacturing and cost can be realized in comparison with the point-focus technique. Following instructions sent from the photoelectric sensors (not shown in the drawings) arranged on the panel of the light convergence assembly 1, the stepping motor 2-9 drives the synchronous gears 2-3, 2-5 through a rotatable shaft 26 to track the movements of the sun everyday. Additionally, the anchor adjusting screws 2-1, 2-2, 2-7, 2-8 of the base assembly can be used to manually adjust the elevation of the light convergence assembly 1 one reciprocation every year, which facilitates the tracking of the movements of the sun. Moreover, converging light by a U-shaped groove 1-3 is more simple than the tower converging structure, which simplifies a double-shaft structure to a single-shaft structure between the base assembly 2 and the frame 1-7.

The sunlight is converged to a $\frac{1}{10}$, or even a $\frac{1}{1000}$ of a receiving surface by the line-focus Fresnel lenses 1-2. The temperature of light convergence can reach above 500-1000° C. and the efficiency of solar convergence can reach above 80%-85%, which can meet the requirements of high temperature and high efficiency solar steam in the present invention. By using such a lens, geometric height (or thickness) of a convex lens can be greatly reduced. With the progress of material and processes nowadays, the lens fabricated through electroplating mold process by using modern optical plastics (such as acrylic and polyethylene (PE)) can be made very thin (almost reaching a thickness of 0.5 mm), light, low cost and long service life (about 15 years).

A series of concentric circles having a zigzag profile are formed on one surface of the line-focus Fresnel lenses 1-2. A circle having a bigger radius than other circle also has a bigger depth. A conicoid is formed at the center of the circles. The other surface just bears against the inner surface of the glass plate 1-1. The heat collecting pipe 1-5 is secured at the inner focus point of the U-shaped groove 1-3 and is provided with a spiral sheetmetal 1-6 therein which allows the high temperature heat conducting oil 6-6 in a spiral movement along the inner wall of the heat collecting pipe and heat up rapidly and uniformly. The high temperature heat conducting oil 6-6 flows through the high temperature heat conducting branch oil pipe 6-1, 6-2 to enter simultaneously into the high temperature oil container 3-5 of the heat exchanger assembly 3 and the high temperature oil container 5-4 of the heat storage chamber assembly 5. The 3D fin pipes 3-5, 5-2 in the heat exchanger assembly 3 and 5 are designed by using the thermal fluid aerodynamic, heat transfer of engineering thermodynamics and evaporation principles (please refer to the inventor's Chinese patent No. ZL200610036971.7). Compared with the same kind of heat exchanger, the area is increased by 5-6 times. The heat collecting pipe 1-5, the heat exchanger assembly 3 and the heat storage chamber assembly 5 can increase the heat conducting efficiency of the heat conducting oil by 30% and double the amount of the steam as well as heat storage rate. The glass plane and the line-focus Fresnel lens are used in combination at the opening of the U-shaped groove 1-3 so as to obtain refraction, reflection and greenhouse effects. With such an arrangement, the light convergence efficiency can reach more than 85%-90% and thus the temperature of the high temperature heat conducting oil 6-6 in the heat conducting pipe 1-5 reaches over 500-1000° C.

The evaporation water level in the heat exchanger assembly 3 is controlled by the water level switch 4-1 in the water level control tank assembly 4. The height of the water level is determined by the steam temperature. A part of 3D fin pipe 3-3 above the water level is used for overheated steam. The overheated steam enters the steam turbine 13 through a steam line 14 and drives the electricity-generator 12 to convey the electricity into the power grid 11. The warm water from the steam turbine flows into the water tank 10 through the water pipe 8-4 and then flows successively through the water pipe 8-3, the water pump 9, the water pipe 8-2, 8-1 to ensure that the water level set in the heat exchanger assembly 3 is at the set water level 3-1. The heat conducting oil heated by the 3D fin pipe 3-4 of the heat exchanger assembly 3 enters the low temperature oil container 3-5, the oil pump 15, low temperature heat conducting pipe 7 and low temperature oil pipe 7-1, and return to the heat collecting pipe 1-5 of the light convergence assembly 1 and is heating up again.

After the high temperature heat conducting oil 6-6 in the 3D fin pipe 5-3 of the heat storage chamber assembly 5 releases heat to the heat storage material 5-3 (conducting oil, cottonseed oil, mirabilite, or soluble salt), the heat conducting oil entering the low temperature oil container 5-5 enters the oil pump 15 and the low temperature heat conducting pipe 7 through the low temperature oil pipe 7-3 and exit A of the temperature-controlling valve 16, and return to the heat collecting pipe 1-5 of the light convergence assembly 1 to be heated up again.

The function of the heat storage chamber assembly 5 is described as follows:

Under the condition of normal sunlight, upon turnoff of the electromagnet D of the temperature-controlling valve 16, the high temperature heat conducting oil 6-6 enters the heat storage chamber assembly 5 through the high temperature heat conducting branch oil pipe 6-2 for thermal storage in the heat storage material 5-3. The low temperature conducting oil enters the low temperature heat conducting pipe 7 through the low temperature oil container 5-5, the low temperature oil pipe 7-3 and the exit A of the temperature-controlling valve 16. The low temperature heat conducting oil returns to the heat collecting pipe 1-5 of the heat collecting assembly 1 under the force of the oil pump 15 to be heated up again. The process continuously cycles to store the solar energy.

During the night and cloudy days, the intensity of solar energy decreases. The temperature of the high temperature heat conducting oil 6-6 in the heat collecting pipe 1-5 is lower than that of daytime, which affects the steam output and the steam temperature of the heat exchanger assembly 3. At this time, the electromagnet D of the temperature-controlling valve 16 is powered on, the solar energy stored in the heat storage material 5-3 is released to the conducting oil 6-6 in the 3D fin pipe 5-2 so as to make the conducting oil in the heat storage chamber assembly 5 heat up to a temperature higher than the conducting oil 6-6 from the light convergence assembly 1. The conducting oil then flows into the high temperature heat conducting main oil pipe 6 and the high temperature heat conducting branch oil pipe 6-1 through the exit B of the temperature-controlling valve 16 and enters the heat exchanger assembly 3, which increases the heat exchange capacity of the 3D fin pipe 3-4 of the heat exchanger assembly 3. In such an arrangement, the high temperature steam is enough to continuously supply power during the night and cloudy days.

The invention claimed is:

1. A ground high-temperature high-efficiency solar steam electricity-generating device comprising a water pump (9), a water tank assembly (10), a steam turbine (13), a generator (12) and a system control circuit, characterized in that the device further comprises a light convergence assembly (1), a heat exchanger assembly (3), a heat storage chamber assembly (5), an oil pump (15) and a temperature-controlling valve (16), wherein a heat collecting pipe (1-5) of the light convergence assembly (1) is provided with a spiral sheet metal (1-6) being filled with high temperature heat conducting oil (6-6) and being respectively communicated with a high temperature oil container (3-6) of the heat exchanger assembly (3) and a high temperature oil container (5-4) of the heat storage chamber assembly (5) through a high temperature heat conducting main oil pipe (6) and respectively through high temperature heat conducting branch oil pipes (6-1, 6-2), the high temperature heat conducting oil (6-6) in the high temperature oil container (3-6) of the heat exchanger assembly (3) flows through a 3D fin pipe (3-4), warm water (3-1) in the heat exchanger assembly (3) is heated by the heat transfer of the 3D fin pipe (3-4) to convert into steam which rises and passes by an overheating space 3D fin pipe (3-3) provided over liquid in the heat exchanger assembly (3) to be re-heated up, and then passes through a high temperature steam pipe (14) to the steam turbine (13) to drive the generator (12) for outputting power to a power grid (11), the high temperature heat conducting oil (6-6) in the high temperature oil container (5-4) of the heat storage chamber assembly (5) flows through a 3D fin pipe (5-2), transfers heat to heat storage material (5-3), and then is forced into the heat collecting pipe (1-5) through a low temperature oil container (5-5), a low temperature oil pipe (7-3), one of the output of temperature-controlling valve (16) and the oil pump (15), and wherein when the temperature in the heat collecting pipe (1-5) decreases during evening or cloudy days, the temperature-controlling valve (16) is activated to allow the high temperature heat conducting oil (6-6) in the heat storage chamber assembly (5) enters the high temperature oil container (3-6) and the 3D fin pipe (3-4) of the heat exchanger assembly (3) through the high temperature heat conducting main oil pipe (6) and the high temperature heat conducting branch oil pipe (6-1) to increase the quantity of steam and temperature in the heat exchanger assembly (3).

2. The ground high-temperature high-efficiency solar steam electricity-generating device according to claim 1 further comprising:
a water level control tank assembly (4) comprising two warm water pipes (8-1, 8-2) and a water level switch (4-1), wherein warm water from the steam turbine (13) flows into a water tank (10) through a water pipe (8-4) and then flows through a water pipe (8-3), a water pump (9), the water pipe (8-2), the water level switch (4-1) and the warm water pipe (8-1) to keep the water level of the warm water (3-1) in the heat exchanger assembly (3) being at the set water level.

3. The ground high-temperature high-efficiency solar steam electricity-generating device according to claim 1 further comprising:
a base assembly (2) which comprises an anchor plate (2-10), four adjusting screws (2-1, 2-2, 2-7, 2-8), two synchronous gears (2-3, 2-5), a chain (2-4), a rotatable shaft (2-6), a stepping motor (2-9), and vertical plates (2-12, 2-13), the anchor plate (2-10) being fixed on the ground by the four adjusting screws (2-1, 2-2, 2-7, 2-8), the inclination of the anchor plate (2-10) with respect to the ground being adjustable by the four adjusting screws (2-1, 2-2, 2-7, 2-8), the vertical plates (2-12, 2-13) being fixedly mounted on the anchor plate (2-10), the rotatable shaft (2-6) being movably inserted in the vertical plate (2-12, 2-13), and fixedly connected to a spindle sleeve (1-9) of a frame (1-7) of the light convergence assembly (1), the stepping motor (2-9) being mounted on the anchor plate (2-10), the synchronous gear (2-3) being fixedly connected to the rotatable shaft of the anchor plate (2-9) and the synchronous gear (2-5) being fixedly connected to the rotatable shaft (2-6), and the chain (2-4) being connected between the two synchronous gears (2-3, 2-5).

4. The ground high-temperature high-efficiency solar steam electricity-generating device according to claim 1, wherein the light convergence assembly (1) comprises:
a glass plate (1-1), line-focus Fresnel lenses (1-2), U-shaped grooves (1-3), thermal insulating material (1-4), the heat collecting pipe (1-5), the spiral sheetmetal (1-6), the high temperature heat conducting oil (6-6), a frame (1-7) formed according to Golden section ration, a rib-plate (1-8), and a spindle sleeve (1-9), the U-shaped grooves (1-3) being arranged in parallel along the longer side of the rectangular frame (1-7), the glass plate (1-1) being positioned above the U-shaped grooves (1-3) for sealing the U-shaped grooves (1-3) to form a greenhouse, the line-focus Fresnel lens (1-2) being positioned under the glass plate (1-1) and its surface bearing against the inner surface of the glass plate (1-1), the rest space of the frame (1-7) being filled with the thermal insulating material (1-4), the heat collecting pipe (1-5) being secured to the U-shaped groove (1-3) at the position of dual focus point thereof, the heat collecting pipe (1-5) being provided with a spiral sheetmetal (1-6) therein and being filled with high temperature heat conducting oil (6-6), the spindle sleeve (1-9) being provided on the rib-plate (1-8) which is positioned at the bottom of the frame 1-7 and being muffle-coupled with a bolt (2-11) of the rotatable shaft (2-6) of the base assembly (2).

5. The ground high-temperature high-efficiency solar steam electricity-generating device according to claim 1, wherein the heat exchanger assembly (3) comprises the high temperature heat conducting branch oil pipe (6-1), the high temperature oil container (3-6), the warm water (3-1), a thermal insulating layer (3-2), the overheating space 3D fin pipe (3-3) positioned in a steam container (3-7) within the heat exchanger assembly (3), the 3D fin pipe (3-4) immersed in the warm water (3-1), a low temperature oil container (3-5), a low temperature oil pipe (7-1), and a high temperature steam pipe (14), and wherein the high temperature heat conducting branch oil pipe (6-1) is communicated at one end with the high temperature heat conducting main oil pipe (6) and at the other end with the high temperature oil container (3-6) and the 3D fin pipe (3-4), the low temperature oil pipe (7-1) is communicated at one end with the low temperature oil container (3-5) and at the other end with a low temperature heat conducting pipe (7) through the oil pump (15), the high temperature steam pipe (14) is communicated at one end with the steam container (3-7) and at the other end with the steam turbine (13).

6. The ground high-temperature high-efficiency solar steam electricity-generating device according to claim 1, wherein the heat storage chamber assembly (5) comprises a thermal insulating layer (5-1), the high temperature heat conducting branch oil pipe (6-2), the 3D fin pipe (5-2), the heat storage material (5-3), the high temperature oil container (5-4), the low temperature oil container (5-5), and the low temperature oil pipe (7-3), and wherein the high temperature heat conducting branch oil pipe (6-2) is communicated at one end with the high temperature heat conducting main oil pipe (6) and at the other end with the high temperature oil container (5-4) and the 3D fin pipe (5-2), the low temperature oil pipe (7-3) is communicated at one end with the low temperature oil container (5-5) and at the other end with one end of temperature-controlling valve (16), the temperature-controlling valve (16) is provided with two exits A and B at the other end thereof, the exit A being communicated with the low temperature heat conducting pipe (7) through the oil pump (15), the exit B being communicated with the high temperature heat conducting main oil pipe (6), the heat storage material (5-3) being positioned in the space defined by the thermal insulating layer (5-1) and surrounding the 3D fin pipe (5-2).

7. The ground high-temperature high-efficiency solar steam electricity-generating device according to claim 6, wherein the heat storage material (5-3) is made of heat conducting oil, cottonseed oil, mirabilite or soluble salt.

8. The ground high-temperature high-efficiency solar steam electricity-generating device according to claim 4, wherein a series of concentric circles are formed on one surface of the line-focus Fresnel lenses (1-2), the depth of the circles increases from the center to the peripheral of the surface, the center of the circles is a curve surface, and the other surface of the line-focus Fresnel lenses (1-2) bears against the inner surface of the glass plate (1-1).

9. The ground high-temperature high-efficiency solar steam electricity-generating device according to claim 1, wherein the heat collecting pipe (1-5) of the light convergence assembly (1) is made of stainless pipes with its surface being coated by a black heat absorption layer, the spiral sheetmetal (1-6) is positioned within the heat collecting pipe (1-5).

10. The ground high-temperature high-efficiency solar steam electricity-generating device according to claim 1, wherein a plurality of photoelectric sensors are provided on the panel of the light convergence assembly (1).

11. The ground high-temperature high-efficiency solar steam electricity-generating device according to claim 3, wherein the light convergence assembly (1) comprises:

a glass plate (1-1), line-focus Fresnel lenses (1-2), U-shaped grooves (1-3), thermal insulating material (1-4), the heat collecting pipe (1-5), the spiral sheetmetal (1-6), the high temperature heat conducting oil (6-6), a frame (1-7) formed according to Golden section ration, a rib-plate (1-8), and a spindle sleeve (1-9), the U-shaped grooves (1-3) being arranged in parallel along the longer side of the rectangular frame (1-7), the glass plate (1-1) being positioned above the U-shaped grooves (1-3) for sealing the U-shaped grooves (1-3) to form a greenhouse, the line-focus Fresnel lens (1-2) being positioned under the glass plate (1-1) and its surface bearing against the inner surface of the glass plate (1-1), the rest space of the frame (1-7) being filled with the thermal insulating material (1-4), the heat collecting pipe (1-5) being secured to the U-shaped groove (1-3) at the position of dual focus point thereof, the heat collecting pipe (1-5) being provided with a spiral sheet metal (1-6) therein and being filled with high temperature heat conducting oil (6-6), the spindle sleeve (1-9) being provided on the rib-plate (1-8) which is positioned at the bottom of the frame 1-7 and being muffle-coupled with a bolt (2-11) of the rotatable shaft (2-6) of the base assembly (2).

* * * * *